US009392549B2

(12) United States Patent
Mobasher et al.

(10) Patent No.: US 9,392,549 B2
(45) Date of Patent: Jul. 12, 2016

(54) REDUCING PRECODER SIGNALING OVERHEAD FOR MIMO COMMUNICATION SYSTEM

(71) Applicant: Broadcom Corporation, Irvine, CA (US)

(72) Inventors: Amin Mobasher, Sunnyvale, CA (US); Sam Alex, Sunnyvale, CA (US); Louay Jalloul, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 222 days.

(21) Appl. No.: 14/298,369

(22) Filed: Jun. 6, 2014

(65) Prior Publication Data

US 2014/0362787 A1 Dec. 11, 2014

Related U.S. Application Data

(60) Provisional application No. 61/833,705, filed on Jun. 11, 2013.

(51) Int. Cl.
*H04W 72/04* (2009.01)
*H04W 52/14* (2009.01)
*H04L 5/00* (2006.01)
*H04B 7/04* (2006.01)
*H04W 52/24* (2009.01)
*H04B 7/06* (2006.01)

(52) U.S. Cl.
CPC ............ *H04W 52/146* (2013.01); *H04B 7/0478* (2013.01); *H04L 5/00* (2013.01); *H04B 7/0632* (2013.01); *H04B 7/0639* (2013.01); *H04L 5/0048* (2013.01); *H04W 52/241* (2013.01)

(58) Field of Classification Search
None
See application file for complete search history.

(56) References Cited

U.S. PATENT DOCUMENTS

| 7,602,745 | B2 * | 10/2009 | Lin | H04B 7/0617 370/203 |
|---|---|---|---|---|
| 8,116,391 | B2 * | 2/2012 | Mielczarek | H04B 7/0434 375/260 |
| 9,094,995 | B2 * | 7/2015 | Sohn | H04L 1/0026 |
| 9,253,784 | B2 * | 2/2016 | Liu | H04L 5/0053 |
| 2002/0136170 | A1 * | 9/2002 | Struhsaker | H01Q 1/246 370/280 |
| 2003/0036359 | A1 * | 2/2003 | Dent | H04L 27/367 455/63.1 |
| 2009/0080549 | A1 * | 3/2009 | Khan | H04B 7/0417 375/260 |
| 2009/0093267 | A1 * | 4/2009 | Ariyur | H04W 52/12 455/522 |
| 2009/0227263 | A1 * | 9/2009 | Agrawal | H04W 16/16 455/452.1 |
| 2011/0164701 | A1 * | 7/2011 | Nikopourdeilami | H03M 7/3088 375/295 |
| 2011/0173446 | A1 * | 7/2011 | Liu | H04K 1/00 713/166 |

(Continued)

*Primary Examiner* — Bunjob Jaroenchonwanit
(74) *Attorney, Agent, or Firm* — Sterne, Kessler, Goldstein & Fox PLLC

(57) ABSTRACT

Where receiver performance at a User Equipment (UE) is similar using a coarse precoder codebook as using a fine resolution precoder codebook, the signaling of a two-component precoder codebook is modified such that a precoder codeword is signaled to the UE in only a portion of the physical resources allocated for precoder codeword signaling to the UE. The remaining portion of the allocated physical resources is used to signal control information to improve the UE's performance.

20 Claims, 5 Drawing Sheets

(56) References Cited

U.S. PATENT DOCUMENTS

| | | | | |
|---|---|---|---|---|
| 2011/0194593 A1* | 8/2011 | Geirhofer | H04W 72/048 | 375/224 |
| 2011/0194638 A1* | 8/2011 | Erell | H04B 7/0417 | 375/267 |
| 2011/0200081 A1* | 8/2011 | Guo | H04B 7/0417 | 375/224 |
| 2011/0243019 A1* | 10/2011 | Prasad | H04W 72/085 | 370/252 |
| 2011/0249578 A1* | 10/2011 | Nayeb Nazar | H04L 1/0027 | 370/252 |
| 2011/0305263 A1* | 12/2011 | Jöngren | H04B 7/0617 | 375/219 |
| 2012/0114024 A1* | 5/2012 | Mielczarek | H04B 7/0434 | 375/219 |
| 2012/0328039 A1* | 12/2012 | Mazzarese | H04B 7/063 | 375/267 |
| 2013/0010749 A1* | 1/2013 | Chang | H04W 52/346 | 370/330 |
| 2013/0058383 A1* | 3/2013 | Alexiou | H04B 7/0639 | 375/219 |
| 2013/0058386 A1* | 3/2013 | Mazzarese | H04B 7/063 | 375/219 |
| 2013/0230116 A1* | 9/2013 | Khojastepour | H04B 7/0639 | 375/267 |
| 2013/0301599 A1* | 11/2013 | Valentin | H04L 1/0026 | 370/329 |
| 2013/0315051 A1* | 11/2013 | Malladi | H04B 7/0417 | 370/210 |
| 2013/0315189 A1* | 11/2013 | Kim | H04L 1/0026 | 370/329 |
| 2014/0036815 A1* | 2/2014 | Lei | H04B 7/0456 | 370/329 |
| 2014/0105317 A1* | 4/2014 | Erell | H04B 7/0417 | 375/267 |
| 2014/0119467 A1* | 5/2014 | Tee | H04B 7/0695 | 375/267 |
| 2014/0233414 A1* | 8/2014 | Prasad | H04W 72/085 | 370/252 |
| 2014/0334567 A1* | 11/2014 | Khojastepour | H04B 7/0639 | 375/267 |
| 2014/0362787 A1* | 12/2014 | Mobasher | H04W 52/146 | 370/329 |
| 2015/0110215 A1* | 4/2015 | Wang | H04B 7/0478 | 375/267 |
| 2015/0124898 A1* | 5/2015 | Lin | H04B 7/0417 | 375/267 |
| 2015/0149816 A1* | 5/2015 | Antonakopoulos | G06F 11/073 | 714/6.11 |
| 2015/0270886 A1* | 9/2015 | Dietrich | H04B 7/0617 | 375/267 |
| 2015/0304010 A1* | 10/2015 | Zhang | H04B 7/0456 | 370/329 |
| 2015/0318959 A1* | 11/2015 | Kim | H04L 1/0618 | 714/749 |
| 2015/0326347 A1* | 11/2015 | Yu | H03M 13/2903 | 714/755 |
| 2015/0333893 A1* | 11/2015 | Lee | H04L 1/0026 | 370/252 |
| 2016/0028462 A1* | 1/2016 | Ma | H01Q 25/00 | 370/329 |
| 2016/0050007 A1* | 2/2016 | Lee | H04B 7/0456 | 370/252 |

* cited by examiner

US 9,392,549 B2

REDUCING PRECODER SIGNALING OVERHEAD FOR MIMO COMMUNICATION SYSTEM

CROSS-REFERENCE TO RELATED APPLICATION(S)

The present application claims the benefit of U.S. Provisional Application No. 61/833,705, filed Jun. 11, 2013, which is incorporated herein by reference in its entirety.

TECHNICAL FIELD

The present disclosure relates generally to enhancing Multiple Input Multiple Output (MIMO) wireless communication efficiency.

BACKGROUND

Background

In a Massive Multiple Input Multiple Output (M-MIMO) communication system, a transmitter, such as a base station, is equipped with a very large number of transmit antennas (e.g., 32, 64, or 100) which can be used simultaneously for transmission to one or more terminals, such as a user equipment (UE).

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digits) in the corresponding reference number.

DETAILED DESCRIPTION OF EMBODIMENTS

Figure 1:
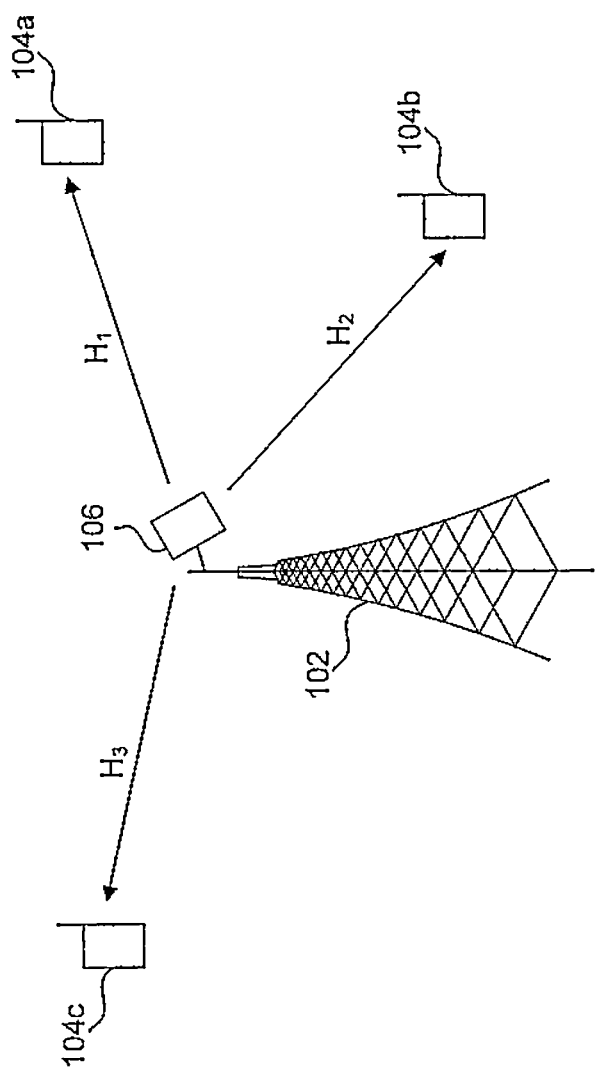
FIG. 1 illustrates an example environment in which embodiments can be practiced or implemented.

FIG. 1 illustrates an example environment 100 in which embodiments can be practiced or implemented. Example environment 100 is provided for the purpose of illustration only and is not limiting of embodiments. As shown in FIG. 1, example environment 100 includes, without limitation, a base station 102 and a plurality of user equipments (UEs) 104a, 104b, and 104c.

Base station 102 can be a cellular network base station, such as an LTE eNB, a WCDMA Node B, or a WiMAX base station, for example. Alternatively, base station 102 can be a wireless network access point (AP), such as a WLAN or a Bluetooth AP, for example. Base station 102 provides network access (voice, video, or data) to UEs 104a, 104b, and 104c.

In an embodiment, base station 102 includes an antenna array 106 that it uses to serve UEs in its vicinity, such as UEs 104a, 104b, and 104c. Antenna array 106 can include a plurality of antennas, each of which can be used for transmission or reception. In an embodiment, antenna array 106 is a massive Multiple Input Multiple Output (M-MIMO) antenna array that includes a significantly larger number of antennas than used in existing base station implementations (which can be up to 8 antenna elements). For example, M-MIMO antenna array 106 can have 16, 32, 64 or more antenna elements.

Figure 3:
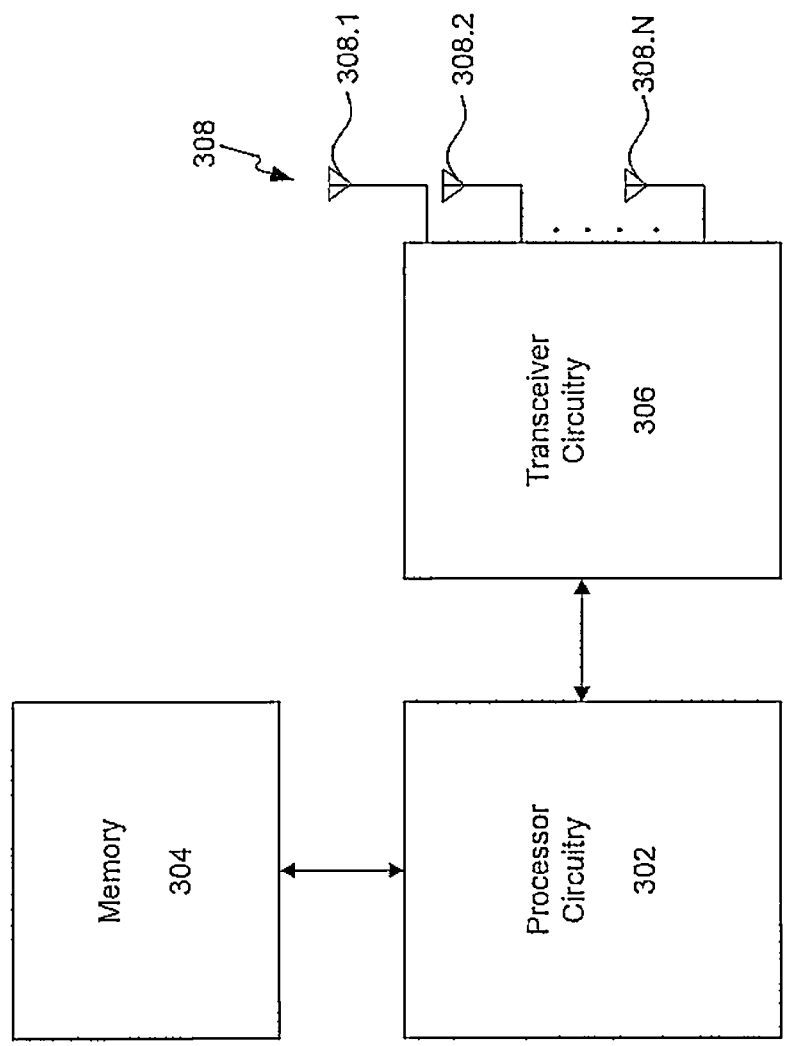
FIG. 3 illustrates an example base station according to an embodiment.

In an embodiment, base station 102 can be implemented as illustrated by example base station 300 shown in FIG. 3. Example base station 300 is provided for the purpose of illustration only and is not limiting of embodiments. As shown in FIG. 3, example base station 300 includes a processor circuitry 302, a memory 304, a transceiver circuitry 306, and an antenna array 308 including a plurality of antenna elements 308.1, 308.2, . . . , 308.N. Processor circuitry 302 can be implemented as described above and can be configured to perform the base station functionalities described herein. In an embodiment, processor circuitry 302 executes logic instructions stored in memory 304 to perform the functionalities described herein. Transceiver circuitry 306 includes digital and/or analog circuitry that perform transmit and receive radio frequency (RF) processing, including filtering, power amplification, frequency up-conversion, frequency down-conversion. etc. Together with antenna array 308, transceiver circuitry 306 enables transmitting and receiving signals by base station 300. In an embodiment, transceiver circuitry 306 and/or antenna array 308 can be controlled by processor circuitry 302 to transmit/receive at a specified time and frequency (physical resource). For example, as further described below, transceiver circuitry 306 and antenna array 308 can be used to signal information to a UE in specified physical resources.

Returning to FIG. 1, in an embodiment, base station 102 can use antenna array 106 to beamform transmissions to UEs 104a, 104b, and 104c. In Single User MIMO (SU-MIMO), base station 102 can beamform one or more data streams (also referred to as "layers") to a single UE in a transmission that occupies a given time and frequency (physical) resource. In Multi-User MIMO (MU-MIMO), base station 102 can beamform two or more data streams to two or more UEs in a transmission that occupies a given physical resource.

In an embodiment, in order to beamform a transmission to one or more of UEs 104a, 104b, and 104c, base station 102 estimates the downlink channels to UEs 104a, 104b, and 104c. The downlink channels to UEs 104a, 104b, and 104c are represented by $H_1$, $H_2$, and $H_3$ respectively in FIG. 1. In a TDD (Time Division Duplexing) mode embodiment (where downlink and uplink transmissions are time-multiplexed on the same frequency band), base station 102 can estimate the downlink channels to UEs 104a, 104b, and 104c based on respective estimates of the uplink channels from UEs 104a, 104b, and 104c to base station 102. Estimates of the uplink channels can be determined based on Sounding Reference Signals (SRS) and/or uplink Demodulation Reference Signals (DMRS) transmitted by UEs 104a, 104b, and 104c to base station 102.

In an FDD (Frequency Division Multiplexing) mode embodiment (where downlink and uplink transmissions can occur simultaneously on different frequency bands), base station 102 can acquire knowledge about the downlink channels to UEs 104a, 104b, and 104c based on Precoder Matrix Indicators (PMIs) signaled by UEs 104*a*, 104*b*, and 104*c* to base station 102. The PMIs identify and recommend downlink precoder codewords to base station 102 for use in beamforming to UEs 104*a*, 104*b*, and 104*c*. The PMIs are typically selected by UEs 104*a*, 104*b*, and 104*c* based on UE-side estimates of the downlink channels, which can be computed by the UEs using downlink reference signals transmitted by base station 102 to UEs 104*a*, 104*b*, and 104*c*.

Base station 102 then determines a precoder matrix (the precoder matrix reduces to a precoder vector when a single data stream is being beamformed) based on the downlink channel estimate(s) and/or the PMIs, and multiplies the data stream(s) by the precoder matrix to generate pre-coded signals. The pre-coded signals are then forwarded (after appropriate processing, including physical resource mapping and radio frequency processing) to antenna array 106 for transmission. In an embodiment, each of the pre-coded signals is coupled to a respective antenna of antenna array 106 for transmission.

In an embodiment, the precoder matrix is composed of a plurality of precoder vectors (each column vector of the precoder matrix corresponds a precoder vector), with each precoder vector corresponding to a respective data stream in the transmission. In an embodiment, each precoder vector corresponds to a precoder codeword selected from a precoder codebook. The precoder codebook, which is known to both base station 102 and the UEs, includes a number of precoder codewords that quantize the precoder vector space.

In an embodiment, the precoder codeword selected for a given data stream is based on the downlink channel to the UE for which the data stream is intended. In one embodiment, the precoder codeword is based on the PMI signaled by the to base station 102. For example, the precoder codeword may be the same as the precoder codeword identified by the PMI. Alternatively, the precoder codeword may be different than the precoder codeword identified by the PMI. In another embodiment, base station 102 determines the precoder codeword based on the estimate of the downlink channel to the UE. For example, the precoder codeword may correspond to the precoder codeword that is closest to the eigenvector with the maximum eigenvalue of a matrix representing the downlink channel to the UE (the matrix is of size m×n, where m represents the number of receive antennas at the UP and a represents the number of transmit antennas at base station 102). Such a precoder codeword ensures that the data stream is transmitted to the UE in a spatial direction of the downlink channel having a maximum signal gain.

To allow the UP to properly demodulate a beamformed data stream, base station 102 indicates the precoder codeword applied to the data stream to the UE. In an embodiment, base station 102 signals to the UE on a control channel an index (PMI) that identifies the used precoder codeword from within the precoder codebook. As conditions of the downlink channel to the UE change, base station 102 may vary the precoder codeword applied to the data stream. In an embodiment, base station 102 periodically signals the PMI to the UE on the control channel.

The efficiency of beamforming from base station 102 to UEs 104*a*, 104*b*, and 104*c* can depend on various factors. For example, beamforming efficiency depends on the ability of base station 102 to acquire good estimates of the downlink channels to UEs 104*a*, 104*b*, and 104*c*. But even if base station 102 had complete, accurate, and current knowledge of the downlink channels to UEs 104*a*, 104*b*, and 104*c*, beamforming efficiency can still be sub-optimal if the pre-coder codebook did not provide a sufficiently granular quantization of the precoder vector space.

To remedy this problem, in one approach, a fine resolution precoder codebook (having a large number of precoder codewords) is used to ensure that base station 102 can adequately approximate a desired precoder vector with a precoder codeword from the precoder codebook. This, however, comes at the expense of an increased signaling overhead associated with signaling the PMI corresponding to the selected precoder codeword to the UE.

In another approach, a two-component precoder codebook is used. According to this approach, the precoder codeword is obtained at the UE from a first component signaled at first time and a second component signaled at a subsequent second time. The first component identifies a first precoder codeword from a coarse resolution precoder codebook (having a small number of precoder codewords). The second component refines the first precoder codeword by identifying a second precoder codeword from a range around the first precoder codeword. In an embodiment, the first component is signaled at a first frequency and the second component is signaled at a second frequency, higher than the first frequency, to the UE. This two-component signaling approach reduces the amount of overhead required to signal a precoder codeword, and thus allows for a finer resolution precoder codebook to be used, improving beamforming efficiency.

Figure 2:
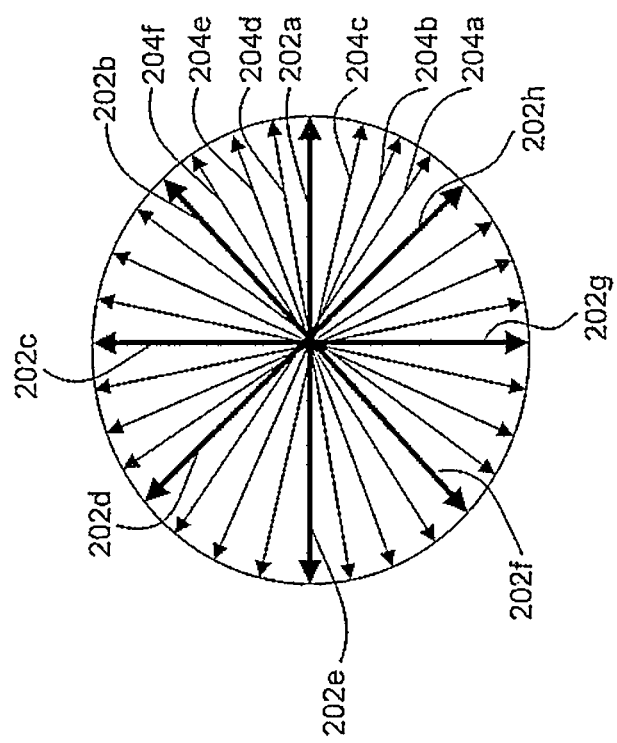
FIG. 2 illustrates an example two-component precoder codebook.

FIG. 2 illustrates an example two-component precoder codebook 200. Example precoder codebook 200 is provided for the purpose of illustration only and is not limiting of embodiments. As shown in FIG. 2, example precoder codebook 200 includes a plurality of precoder codewords that quantize the precoder vector space. The number of precoder codewords shown in FIG. 2 is provided for the purpose of illustration only. A first set of the precoder codewords, precoder codewords 202*a*, 202*b*, 202*c*, 202*d*, 202*e*, 202*f*, 202*g*, and 202*h*, form a coarse resolution precoder codebook within the two-component precoder codebook 200.

In an embodiment, to signal a precoder codeword, e.g., 204*a*, from precoder codebook 200, a precoder codeword from the coarse resolution precoder codebook, e.g., 202*a*, is first signaled in the first component to the UE. In example codebook 200, the coarse resolution precoder codebook includes 8 precoder codewords, each of which can be signaled using 3 bits. Subsequently, the precoder codeword, e.g., 204*a*, is signaled from a range of precoder codewords around the (coarse resolution) precoder codeword, e.g., 202*a*, signaled in the first component. In example precoder codebook 200, this includes signaling precoder codeword 204*a* from the range including precoder codewords 204*a*, 204*b*, 204*c*, 204*d*, 204*e*, and 204*f*, which can be done using 3 bits.

A two-component precoder codebook, such as example precoder codebook 200, improves beamforming efficiency as described above, especially when downlink channel conditions vary significantly in between signaling cycles of the PMI to the UE. However, if the downlink channel conditions are not varying quickly relative to the rate of PMI signaling and/or when the transmission parameters from the base station to the UE are such that substantially similar receiver performance can be achieved at the UE using a coarse resolution precoder codebook as using a fine resolution precoder codebook (e.g., using M-MIMO transmission, a desired receiver performance may be achieved irrespective of whether a coarse or fine resolution precoder codebook is used if only a small number of distant users arc being served), then a two-component precoder codebook can be wasteful of downlink resources. In such or similar conditions, the two-component precoder codebook signaling can be modified, in an embodiment, such that the precoder codeword is signaled to the UE using only the physical resource allocated for signaling the first component of the two-component precoder to the UE. The physical resource (e.g., of the downlink control channel) allocated for signaling the second component of the two-component precoder is used to signal control information to the UE to improve the UE's performance.

Figure 4:
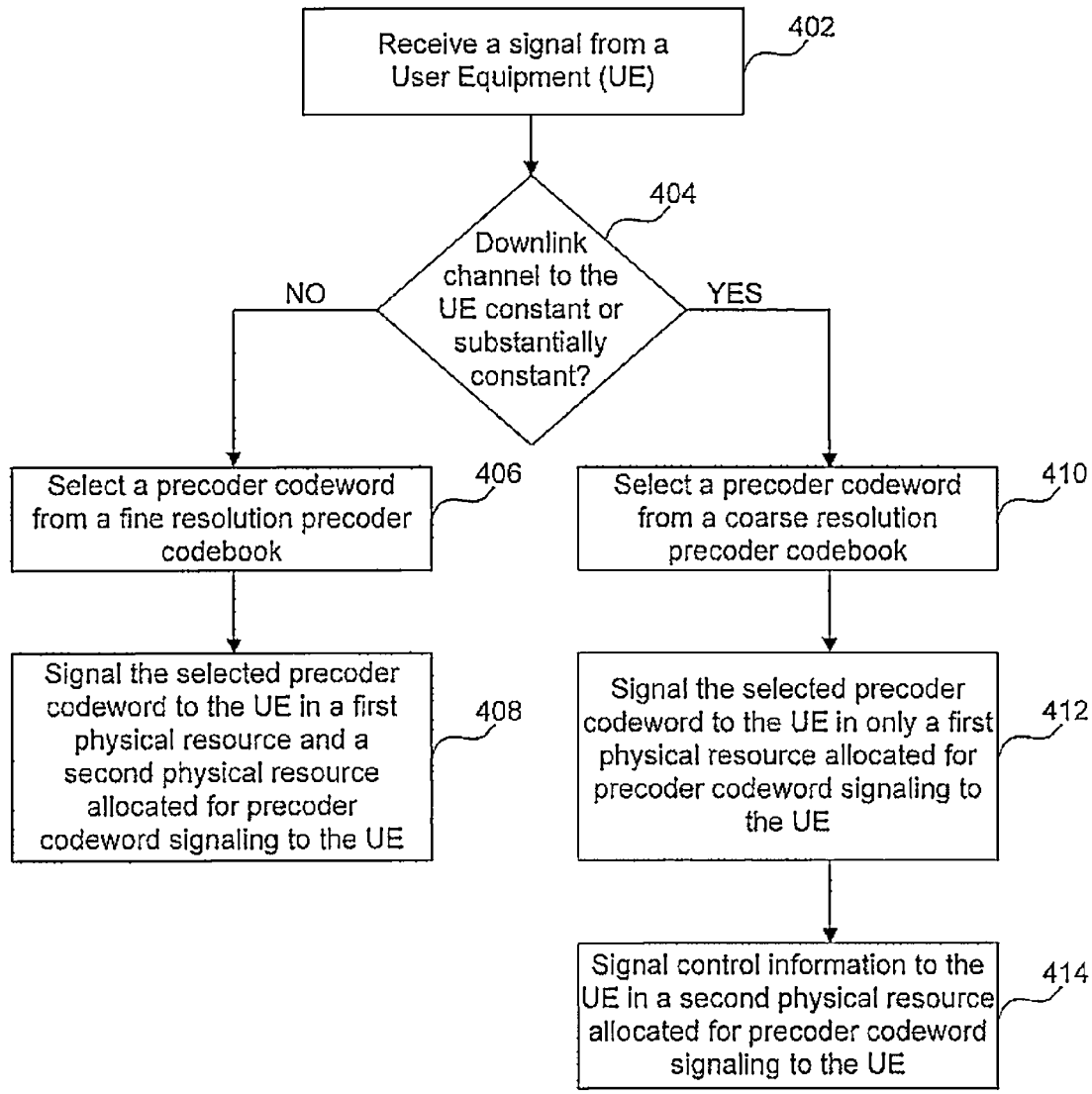
FIG. 4 illustrates an example process according to an embodiment.

FIG. 4 illustrates an example process 400 according to an embodiment. Example process 400 is provided for the purpose of illustration only and is not limiting of embodiments. Example process 400 can be performed by a base station, such as base station 102 or 300, to convey a precoder codeword to a UE. As shown in FIG. 4, process 400 includes steps 402, 404, 406, 408, 410, 412, and 414. In an embodiment, steps 402, 404, 406, and 410 can be performed by processor circuitry, such as processor circuitry 302 of example base station 300. Steps 408, 412, and 414 can be performed by transceiver circuitry, such as transceiver circuitry 306 of example base station 300.

As shown in FIG. 4, process 400 begins in step 402, which includes receiving a signal from the UE. In one embodiment, the received signal includes a pilot signal. For example, the signal may be an SRS or a DMRS. In another embodiment, the received signal includes a PMI that identifies a precoder codeword from a precoder codebook.

Next, process 400 proceeds to step 404, which includes determining if the downlink channel to the UE is constant or substantially constant. In an embodiment, the base station determines if the downlink channel is constant or substantially constant using the signal received in step 402. In an embodiment, where the received signal includes a pilot signal, step 404 can include determining an estimate of an uplink channel from the UE to the base station using the pilot signal, determining an estimate of the downlink channel to the UE based on the estimate of the uplink channel, and determining if the downlink channel to the UE is constant or substantially constant using the estimate of the downlink channel to the UE. In an embodiment, this includes comparing the estimate of the downlink channel to the UE with a previous estimate of the downlink channel to the UE obtained at a previous time, and determining if the downlink channel to the UE is constant or substantially constant based on the comparison.

In another embodiment, where the received signal includes a PMI, step 404 can include comparing the PMI to a previous PMI signaled by the UE to the base station, and determining if the downlink channel to the UE is constant or substantially constant based on the comparison. For example, the PMI is significantly different from the previous PMI, then the base station can infer that the downlink channel is changing quickly. Alternatively, if the PMI is the same as or substantially close to the previous PMI, then the base station can determine that the downlink channel is constant or substantially constant.

In a further embodiment, step 404 can include determining a coherence time or a Doppler spread of the downlink channel to the UE using the signal received in step 402, and determining if the downlink channel to the UE is constant or substantially constant based on the coherence time or the Doppler spread. The coherence time or the Doppler spread characterizes the time varying nature of the downlink channel caused by either relative motion between the UE and the base station or by movement of objects in the downlink channel.

If the downlink channel to the UE is determined as not constant or substantially constant in step 404, process 400 proceeds to step 406, which includes selecting the precoder codeword from a fine resolution precoder codebook. For example, the fine resolution precoder codebook may include all of the precoder codewords of example precoder codebook 200. Next, step 408 includes signaling the selected precoder codeword to the UE in a first physical resource and a second physical resource allocated for precoder codeword signaling to the UE. Specifically, step 408 includes signaling a first component of the selected precoder codeword to the UE in the first physical resource and signaling a second component of the selected precoder codeword to the UE in the second physical resource.

Alternatively, if the downlink channel to the UE is determined as constant or substantially constant in step 404, process 400 proceeds to step 410, which includes selecting the precoder codeword from a coarse resolution precoder codebook. For example, the coarse resolution precoder codebook may include precoder codewords 202*a*, 202*b*, 202*c*, 202*d*, 202*e*, 202*f*, 202*g*, and 202*h* only of example precoder codebook 200. In an embodiment, the selected precoder codeword corresponds to the first component of a two-component precoder codeword.

Subsequently, step 412 includes signaling the selected precoder codeword to the UE in the first physical resource allocated for precoder codeword signaling to the UE, and step 414 includes signaling control information to the UE in the second physical resource allocated for precoder codeword signaling to the UE. The control information can be of any type, including, for example, power control information for adjusting a transmit power level of the UE, MU-MIMO transmission parameters (e.g., number of UEs involved in the MU-MIMO transmission, PMIs of other UEs involved the MU-MIMO transmission, modulation schemes of other UEs involved the MU-MIMO transmission, etc.), etc. In another embodiment, the selected precoder codeword can be signaled in a portion of the first physical resource and/or a portion of th second physical resource, with the remaining portions of the first physical resource and/or the second physical resource used for signaling control information to the UE. Coarser resolution precoder codebooks can be used for selecting the two components of the precoder codeword.

Figure 5:
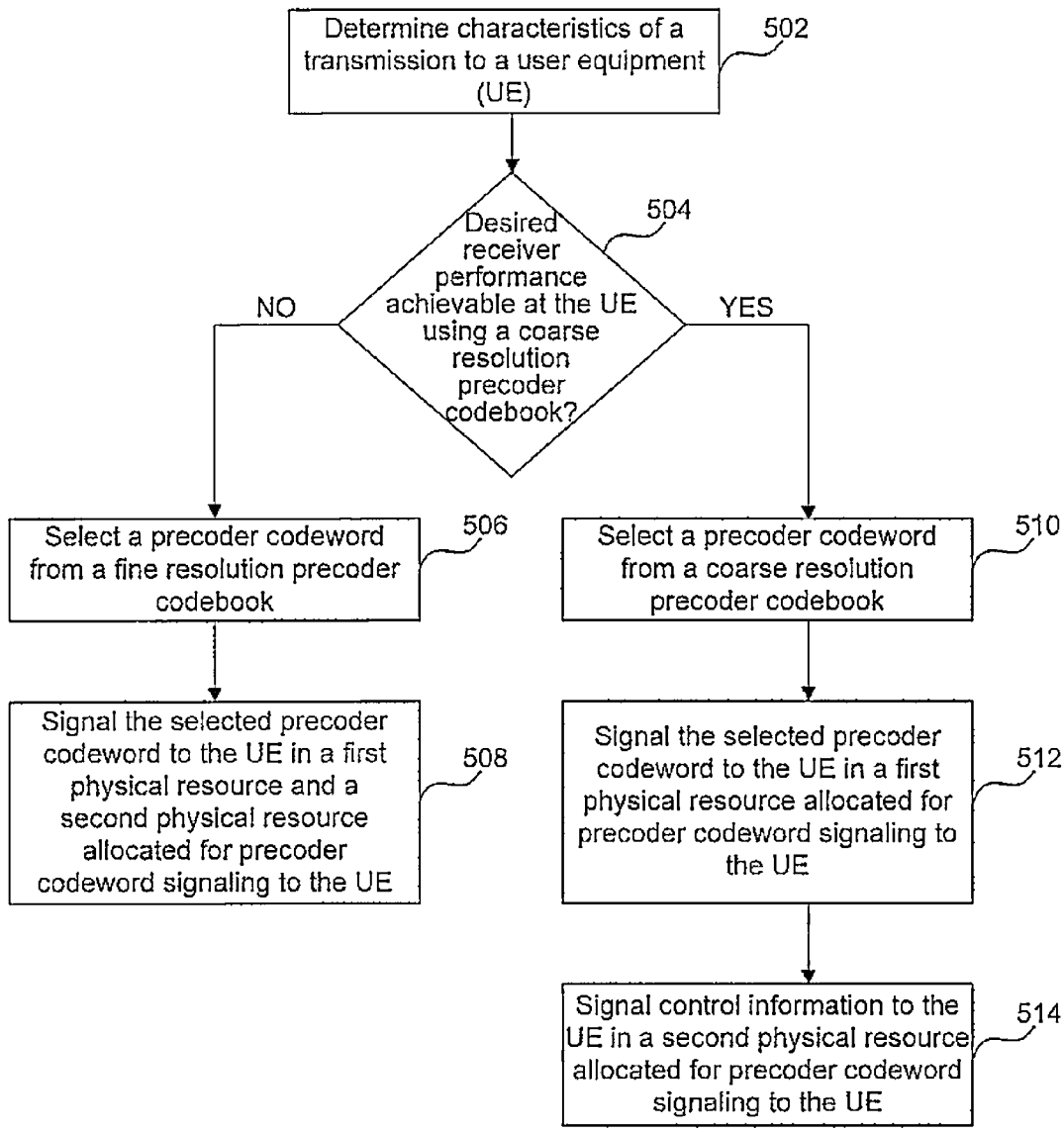
FIG. 5 illustrates another example process according to an embodiment.

FIG. 5 illustrates another example process 500 according to an embodiment. Example process 500 is provided for the purpose of illustration only and is not limiting of embodiments. Example process 500 can be performed by a base station, such as base station 102 or 300, to convey a precoder codeword to a UE. As shown in FIG. 5, process 500 includes steps 502, 504, 506, 508, 510, 512, and 514. In an embodiment, steps 502, 504, 506, and 510 can be performed by processor circuitry, such as processor circuitry 302 of example base station 300. Steps 508, 512, and 514 can be performed by a transceiver circuit, such as the transceiver circuit of example base station 300.

As shown in FIG. 5, process 500 begins in step 502, which includes determining characteristics of a transmission to a UE. In an embodiment, the transmission characteristics determined in step 502 can include any transmission parameter that can affect receiver performance (e.g., signal-to-interference-and-noise ratio (SINR), throughput, etc.) at the UE. For example, where the receiver performance of interest is SINR and/or throughput at the UE, step 502 can include determining a number of transmit antennas of the base station used in the transmission. Generally, the number of transmit antennas used at the base station is indicative of the base station's ability to focus transmission power in specific spatial directions (beamforming capability). As the base station's beamforming capability increases, higher receiver performance can be achieved at the UE. For example, a M-MIMO transmission from the base station can achieve very large SINR and/or throughput at the UE.

Step 502 may also include determining a number of receive antennas of the UE used for receiving the transmission. The number of receive antennas at the UE corresponds to the number of receive degrees of freedom of the UE and is indicative of the UE's ability to demodulate information. For example, a UE that uses multiple receive antennas can perform joint detection to improve receiver performance.

Step 502 may further include determining a number of data streams for the UE in the transmission, a total number of UEs served by the transmission, and precoder codewords used for other UEs served by the transmission. Each of these parameters can be indicative of the complexity of the demodulation that must be performed at the UE to demodulate the data streams intended for the UE and can affect receiver performance at the UE. For example, the number of data streams for the UE indicates the number of available receive degrees of freedom at the UE, with less receive degrees of freedom being available with more data streams for the UE. The total number of UEs served by the transmission is indicative of the interference that will be experienced by the UE during the transmission. The precoder codewords used for other UEs served by the transmission can also be indicative of the interference that will be experienced by the UE during the transmission. For example, if the precoder codewords are orthogonal to the precoder codeword used for the UE, then the UE will experience minimal or no interference.

Subsequently, step 504 includes determining if a desired receiver performance is achievable at the UE using a coarse precoder codebook for the transmission. In an embodiment, the desired receiver performance can be pre-determined. For example, the desired receiver performance may correspond to a desired SINR and/or a desired throughput at the UE. In an embodiment, the receiver performance can be determined by the base station or the UE. For example, the UE can measure nearby interference and indicate whether a coarse resolution codebook is sufficient to the base station.

In an embodiment, step 504 can include estimating the receiver performance based on the transmission characteristics determined in step 502 and comparing the estimated receiver performance to the desired receiver performance. For example, in an embodiment, the base station may have knowledge of receiver performance based on a Channel Quality Indicator (CQI) signaled by the UE to the base station during a link adaptation phase. The signaled CQI is typically determined by the UE based on a recommended PMI, selected by the UE. As such, in an embodiment, step 504 can include estimating a CQI for the UE based on a modification of the PMI from the PMI recommended by the UE to a PMI that corresponds to the precoder codeword being selected by the base station for the UE from the coarse resolution precoder codebook. The estimated CQI can be used as an estimate of the receiver performance.

In another embodiment, step 504 includes determining if the receiver performance using the coarse resolution precoder codebook is comparable to the receiver performance using the fine resolution precoder codebook. In other words, the desired receiver performance corresponds to the receiver performance achievable using the fine resolution precoder codebook.

In an embodiment, receiver performance using the coarse resolution precoder codebook and using the fine resolution precoder codebook is pre-characterized for various combinations of transmission characteristics as described above. For example, receiver performance using the coarse resolution precoder codebook and using the fine resolution precoder codebook can be determined for various combinations of: number of transmit antennas at the base station, number of receive antennas at the UE, number of data streams for the UE, total number of UEs served by the transmission, precoder codewords used for the other UEs, etc. The combinations of transmission characteristics that result in comparable receiver performance for the fine resolution precoder codebook and the coarse resolution precoder codebook are identified and stored. Accordingly, in an embodiment, step 504 can include determining whether the transmission characteristics determined in step 502 correspond to a combination of the identified combinations that result in comparable receiver performance for the fine resolution precoder codebook and the coarse resolution precoder codebook.

If the answer to step 504 is no, process 500 proceeds to step 506 and then to step 508. Steps 506 and 508 are similar to steps 406 and 408 described above with respect to process 400. Otherwise, if the answer to step 506 is yes, process 500 transitions to step 510, and then to steps 512 and 514. Steps 510, 512, and 514 are similar to steps 410, 412, and 414 described above with respect to process 400.

For purposes of this disclosure, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

For purposes of this disclosure, the term "processor circuitry" shall be understood to include one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal or external memory to retrieve instructions stored in the memory, which when executed by the processor, perform the corresponding function(s) associated with the processor.

In this disclosure, terms defined by the Long-Term Evolution (LTE) standard are sometimes used. For example, the term "eNodeB" or "eNB" is used to refer to what is commonly described as a base station (BS) or a base transceiver station (BTS) in other standards. The term "User Equipment (UE)" is used to refer to what is commonly described as a mobile station (MS) or mobile terminal in other standards. However, as will be apparent to a person of skill in the art based on the teachings herein, embodiments are not limited to the LTE standard and can be applied to other wireless communication standards, including, without limitation, WiMAX, WCDMA, WLAN, and Bluetooth.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A base station, comprising:
    processor circuitry configured to:
        determine if a downlink channel to a user equipment (UE) is constant or substantially constant; and
        select a precoder codeword from a coarse resolution precoder codebook when the downlink channel to the UE is constant or substantially constant; and
    transceiver circuit configured, when the downlink channel to the UE is constant or substantially constant, to:
        signal the selected precoder codeword to the UE in a first physical resource allocated for precoder codeword signaling to the UE; and
        convey control information to the UE in a second physical resource allocated for precoder codeword signaling to the UE.

2. The base station of claim 1, wherein the processor circuitry is configured to:
    receive a signal from the UE; and
    determine if the downlink channel to the UE is constant or substantially constant using the signal.

3. The base station of claim 2, wherein the signal comprises a pilot signal, and wherein the processor circuitry is further configured to:
    determine an estimate of an uplink channel from the UE to the base station using the pilot signal;
    determine an estimate of the downlink channel to the UE based on the estimate of the uplink channel; and
    determine if the downlink channel to the UE is constant or substantially constant using the estimate of the downlink channel to the UE.

4. The base station of claim 3, wherein the processor circuitry is further configured to:
    compare the estimate of the downlink channel to the UE with a previous estimate of the downlink channel to the UE; and
    determine if the downlink channel to the UE is constant or substantially constant based on the comparison.

5. The base station of claim 2, wherein the signal comprises a precoder matrix indicator (PMI), and wherein the processor circuitry is further configured to:
    compare the PMI to a previous PMI signaled by the UE to the base station; and
    determine if the downlink channel to the UE is constant or substantially constant based on the comparison.

6. The base station of claim 2, wherein the processor circuitry is further configured to:
    determine a coherence time or a Doppler spread of the downlink channel to the UE using the signal; and
    determine if the downlink channel to the UE is constant or substantially constant based on the coherence time or the Doppler spread.

7. The base station of claim 1, wherein when the downlink channel to the UE is not constant or substantially constant, the processor circuitry is configured to select the precoder codeword from: a fine resolution precoder codebook and the transceiver circuit is configured to signal the selected precoder codeword to the UE in the first physical resource and the second physical resource allocated for precoder codeword signaling to the UE.

8. The base station of claim 7, wherein when the downlink channel to the UE is not constant or substantially constant, the transceiver circuit is further configured to signal a first component of the selected precoder codeword to the UE in the first physical resource and to signal a second component of the selected precoder codeword to the UE in the second physical resource.

9. The base station of claim 1, wherein the control information includes power control information for adjusting a transmit power level of the UE.

10. The base station of claim 1, wherein the transceiver circuit includes a massive Multiple Input Multiple Output (M-MIMO) antenna array.

11. A method performed by a base station to convey a precoder codeword to a user equipment (UE), comprising:
    determining if a downlink channel to a user equipment (UE) is constant or substantially constant; and
    if the downlink channel to the UE is constant or substantially constant,
    selecting a precoder codeword from a coarse resolution precoder codebook;
    signaling the selected precoder codeword to the UE in a first physical resource allocated for precoder codeword signaling to the UE; and
    conveying control information to the UE in a second physical resource allocated for precoder codeword signaling to the UE.

12. The method of claim 11, further comprising:
    receiving a signal from the UE; and
    determining if the downlink channel to the UE is constant or substantially constant using the signal.

13. The method of claim 12, wherein the signal comprises a pilot signal, the method further comprising:
    determining an estimate of an uplink channel from the UE to the base station using the pilot signal;
    determining an estimate of the downlink channel to the UE based on the estimate of the uplink channel; and
    determining if the downlink channel to the UE is constant or substantially constant using the estimate of the downlink channel to the UE.

14. The method of claim 13, further comprising:
    comparing the estimate of the downlink channel to the UE with a previous estimate of the downlink channel to the UE; and
    determining if the downlink channel to the UE is constant or substantially constant based on the comparison.

15. The method of claim 12, wherein the signal comprises a precoder matrix indicator (PMI), the method further comprising:
    comparing the PMI to a previous PMI signaled by the UE to the base station; and
    determining if the downlink channel to the UE is constant or substantially constant based on the comparison.

16. The method of claim 11, wherein if the downlink channel to the UE is not constant or substantially constant, the method further comprises:
    selecting the precoder codeword from a fine resolution precoder codebook; and signaling the selected precoder codeword to the UE in the first physical resource and the second physical resource allocated for precoder codeword signaling to the UE.

17. The method of claim 16, wherein signaling the selected precoder codeword to the UE in the first physical resource and the second physical resource comprises signaling a first component of the selected precoder codeword to the UE in the first physical resource and signaling a second component of the selected precoder codeword to the UE in the second physical resource.

18. A base station, comprising:
  processor circuitry configured to:
    determine if a desired receiver performance is achievable at a user equipment (UE) using a coarse resolution precoder codebook for a transmission; and
    select a precoder codeword from the coarse resolution precoder codebook when the desired receiver performance is achievable at the UE using the coarse resolution precoder codebook; and
  a transceiver circuit configured to:
    convey the selected precoder codeword to the UE in a first physical resource of a plurality of physical resources allocated for precoder codeword signaling to the UE when the desired receiver performance is achievable at the UE using the coarse resolution precoder codebook.

19. The base station of claim 18, wherein the processor circuitry is further configured to:
  determine characteristics of the transmission; and
  determine if the desired received performance at the UE is achievable using the coarse resolution precoder based on the determined characteristics of the transmission.

20. The base station of claim 19, wherein the processor circuitry is further configured to:
  determine a number of transmit antennas of the base station used in the transmission;
  determine a number of receive antennas of the UE used for receiving the transmission;
  determine a number of data streams for the UE in the transmission;
  determine a total number of user equipments (UEs) served by the transmission; or
  determine precoder codewords used for other UEs served by the transmission.

* * * * *